United States Patent
Anubolu et al.

[19]

[11] Patent Number: 5,948,076
[45] Date of Patent: Sep. 7, 1999

[54] METHOD AND SYSTEM FOR CHANGING PERIPHERAL COMPONENT INTERCONNECT CONFIGURATION REGISTERS

[75] Inventors: Surendra Anubolu, Fremont; Samuel C. M. Chih, Mountain View; Jacqueline Irene Humfeld, San Jose, all of Calif.

[73] Assignee: Adaptec, Inc., Milpitas, Calif.

[21] Appl. No.: 09/001,615

[22] Filed: Dec. 31, 1997

[51] Int. Cl.$^6$ ...................................................... G06F 13/00
[52] U.S. Cl. .................................................. 710/8; 710/10
[58] Field of Search .............................. 710/8–14, 62–72

[56] References Cited

U.S. PATENT DOCUMENTS

| | | | |
|---|---|---|---|
| 5,680,632 | 10/1997 | Studor et al. ...................... | 395/800.43 |
| 5,790,804 | 8/1998 | Osborne .............................. | 395/200.75 |
| 5,790,888 | 8/1998 | Dreyer et al. ................. | 710/5 |
| 5,797,038 | 8/1998 | Crawford et al. ........................ | 710/48 |
| 5,826,105 | 10/1998 | Burstein et al. ........................... | 710/22 |
| 5,881,317 | 3/1999 | Hampsten et al. ........................ | 710/62 |

*Primary Examiner*—Ayaz R. Sheikh
*Assistant Examiner*—David A. Wiley
*Attorney, Agent, or Firm*—Martine Penilla & Kim, LLP

[57] ABSTRACT

The present invention provides the new capability to change PCI configuration registers. For example, the present invention allows programs, such as operating systems and device drivers, which are typically programmed to only look to the device ID, without looking to the subsystem ID, to read the subsystem ID when appropriate. If the programs do not read the subsystem ID register, then when appropriate, the full or partial content of the subsystem ID is copied into the device ID register.

16 Claims, 6 Drawing Sheets

METHOD AND SYSTEM FOR CHANGING PERIPHERAL COMPONENT INTERCONNECT CONFIGURATION REGISTERS

BACKGROUND OF THE INVENTION

1. Field of the Invention

The present invention relates generally to computer input/output subsystems, and more particularly, to changing peripheral component interconnect (PCI) configuration registers on PCI bus based devices.

2. Description of the Related Art

A peripheral component interconnect (PCI) bus can couple various devices with other components of a computer system. For instance, the PCI bus may connect devices, herein referred to as PCI devices, such as video cards or network cards to the processor and memory of the computer system. The PCI bus is a standard in the industry and typically allows "plug and play" such that the PCI device coupled to the PCI bus configures itself without user intervention.

The PCI device typically provides a device identification (ID) and a vendor ID to identify the PCI device and the manufacturer of the device. The vendor ID is typically uniquely assigned to each PCI device manufacturer. This combination of information should identify the capabilities of the device. Accordingly, the software, such as the operating system (OS) and drivers, can exploit the capabilities of the device. Most operating systems (referred to as legacy operating systems) typically use the device ID/ vendor ID field to decide which driver to be loaded for the particular PCI device.

The PCI device also typically includes other information such as subsystem ED and sub-vendor ID. The subsystem ID indicates which system device is being used, and the sub-vendor ID indicates the maker of the board. Examples of the various subsystems which can be identified by the subsystem ID include the small computer system interface (SCSI), and the redundant array of independent drives (RAID) subsystems.

The standard procedure is for the operating system to read the subsystem ID and sub-vendor ID of the PCI device to determine which device driver to load for the PCI device. If there is a match, then the proper device driver is loaded, but if there is no match, then the device ID and vendor ID should be read to determine which device driver to utilize. However, in actual conventional practice, the current operating systems typically skip reading the subsystem ID and sub-vendor ID and look directly to the device ID and vendor ID to determine which driver to load.

A problem can arise when a PCI device includes multiple subsystems which are not alike. For instance, a PCI device may include a SCSI card as well as a more complicated subsystem such as a RAID, single-channel adapter, multi-channel adapter, combination card, or a differential. When an operating system or a driver reads the device ID without reading the subsystem ID, the operating system typically cannot accurately determine which driver is the most optimal driver to load. For example, a SCSI driver can understand both the SCSI card and the RAID card. A RAID driver, however, can only understand the RAID card. A problem arises when both the RAID the SCSI cards need to be accessed but a RAID driver is loaded due to the operating system or device driver not having read the subsystem ID.

What is needed is a system and method for providing a determination of which driver to load when a computer system utilizes an operating system or a device driver which typically reads the device ID without reading the subsystem ID. The present invention addresses such a need.

SUMMARY OF THE INVENTION

The present invention provides a new capability to change PCI configuration registers. For example, the present invention allows computer programs, such as operating systems and device drivers, which are typically programmed to only look to the device ID, without looking to the subsystem ID, to read the subsystem ID when appropriate. If the programs do not read the subsystem ID register, then when appropriate, the content of the subsystem ID is copied into the device ID register.

The term "copy" is meant to include the concept of redirecting the access from the register which is being read to the register from which the contents are "copied". For example, copying the content of the subsystem ID register into the device ID register can include the concept of redirecting access from the device ID register to the subsystem ID register. In addition, depending on the specification, the transfer of register content may include the full register or a partial content of a register.

Copying the content of one register to another is appropriate when predetermined conditions are met. For example, in determining which device driver to load for a PCI device, it may be appropriate to copy the contents of the subsystem ID register to the device ID register when software, such as the O/S or device drivers, do not look to the subsystem ID and the PCI device is part of a subsystem which is more complicated than a SCSI, such as a RAID or a differential.

A system and method according to the present invention for changing a configuration register in a device coupled to a computer system comprises the steps of determining whether a program in the computer system accesses the content of a first register; and copying the content of the first register into the second register if the program does not access the content of the first register.

DETAILED DESCRIPTION OF THE PREFERRED EMBODIMENTS

The following description is presented to enable one of ordinary skill in the art to make and to use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
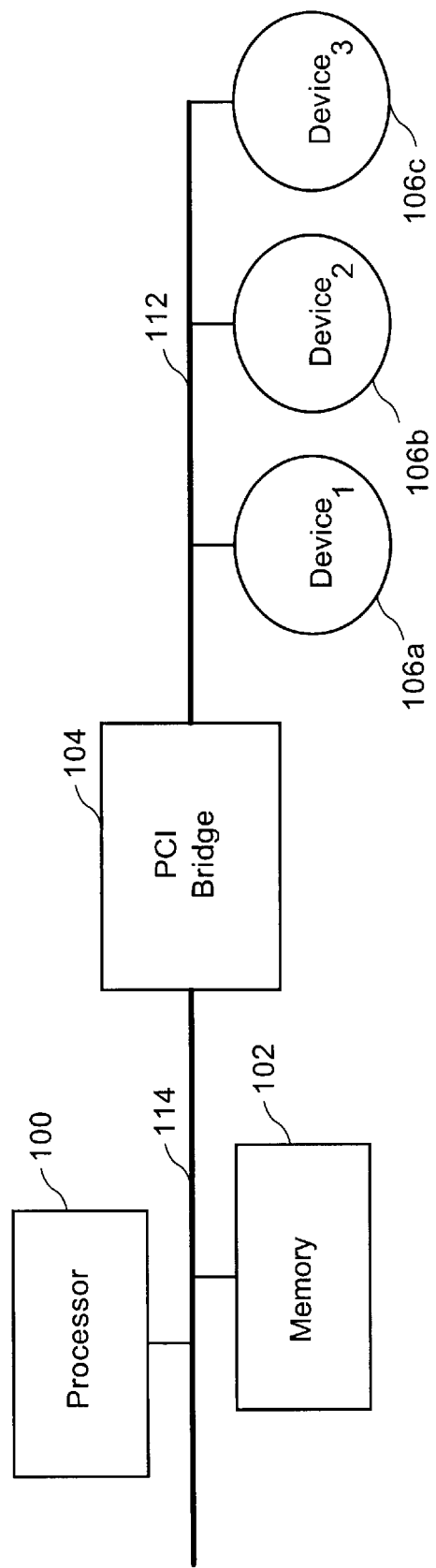
FIG. 1 is a block diagram of a system in which the present invention can reside.

FIG. 1 is a block diagram of a system in which the present invention can reside. The system of FIG. 1 shows a processor 100, a memory 102, a peripheral component interconnect (PCI) bridge 104, and several PCI devices 106a–106c. The processor 100 is shown to be coupled with the memory 102 via a bus 114. The bus 114 is also coupled to the PCI bridge 104 which bridges the protocol between bus 114 and the PCI bus 112. The PCI bus 112 can connect several PCI devices such as a video card, a hard disc controller, or a network card. These PCI devices are typically "plug-and-play" such that they configure themselves without user intervention.

Figure 2:
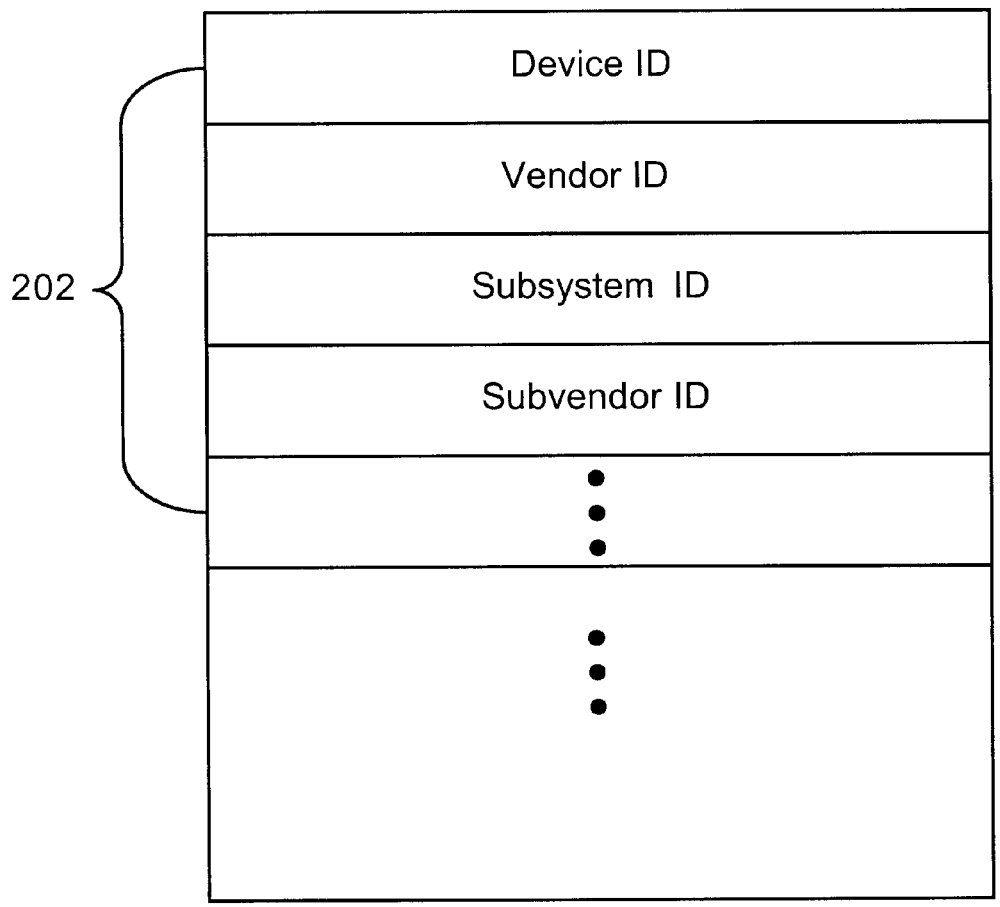
FIG. 2 is an illustration of a configuration space within a PCI device.

The PCI devices 106a–106c typically include a configuration space 200, an example of which is shown in FIG. 2. The configuration space 200 of FIG. 2 is shown to include configuration fields or registers 202. These registers 202 can include descriptions such as device ID, vendor ID, subsystem ID, and sub-vendor ID.

Figure 3:
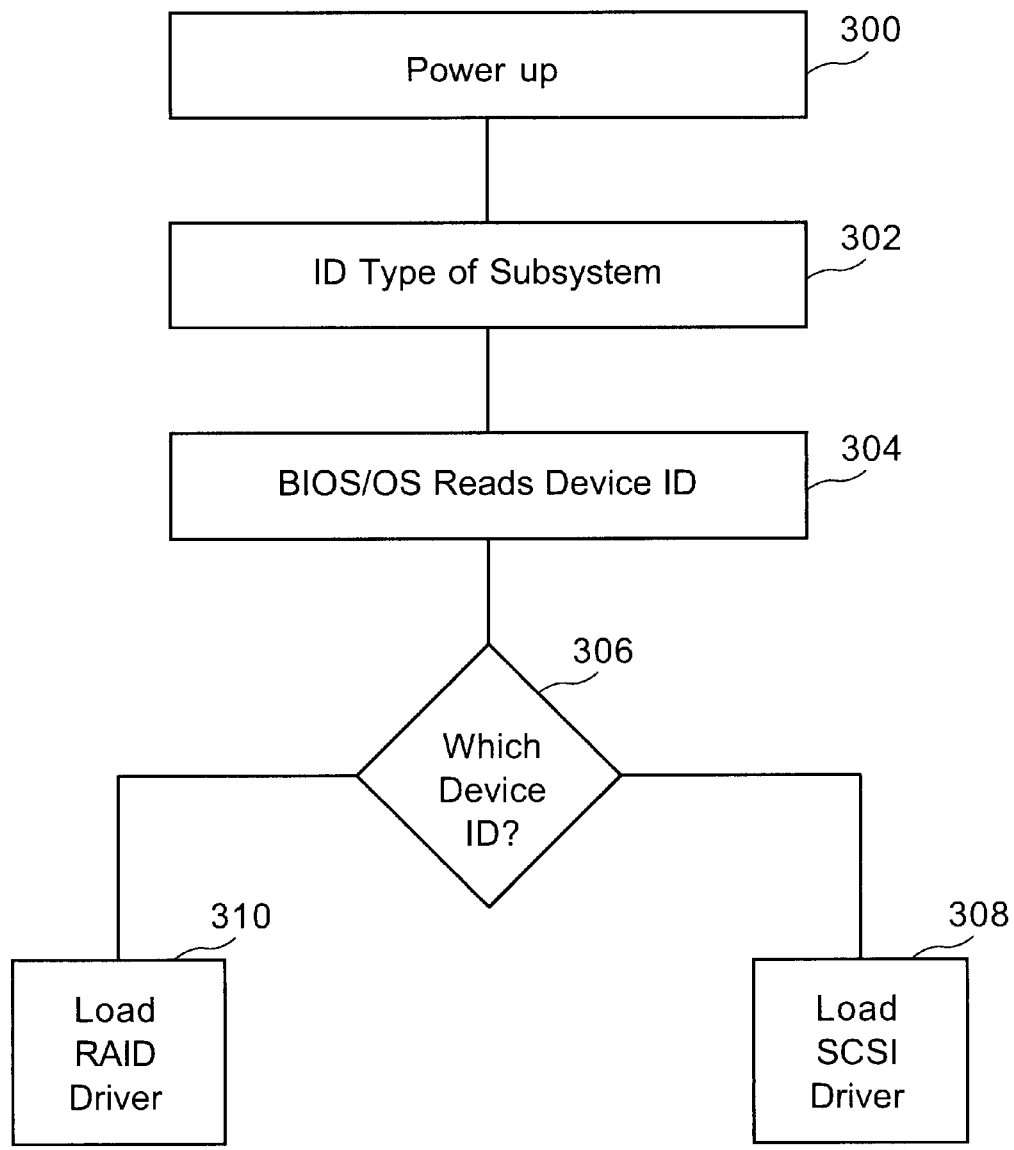
FIG. 3 is a flow diagram of a conventional method for determining which driver to load.

FIG. 3 shows a flow diagram of a conventional method for determining which driver to load. The computer system is powered up via step 300. The type of subsystem is then identified via step 302. Examples of the type of subsystems can be a SCSI, single-channel adapter, multi-channel adapter, combination card (typically a combination of SCSI and 1394), or a RAID system. Typically, upon power up, a serial device shifts data, such as subsystem ID, into the PCI device, thus writing a subsystem ID onto the subsystem ID register in the configuration space of a PCI device. The BIOS/OS then typically reads the device ID via step 304. It is then determined which driver to load based on the device ID via step 306. Then, a particular driver can be loaded, such as the RAID driver via step 310 or the SCSI driver via step 308.

A problem arises with the conventional method when a single device has both a SCSI card and a more complicated card, such as a RAID card. Both the SCSI card and the RAID card will have the same device ID since it is included within the same device, however, the SCSI card will have a subsystem ID which identifies the subsystem as a SCSI card while the RAID card will have a subsystem ID which identifies it as a RAID card. Although a standard was set which originally intended the operating system to view the subsystem ID prior to viewing the device ID, current operating systems typically look only to the device ID without reading the subsystem ID. The device ID will be the same for both the SCSI and the RAID cards located within the device so the operating system may load the RAID driver for both the SCSI card and the RAID card. Since the RAID driver can only understand the RAID card, only the RAID card can be utilized.

What is needed is a system and method for providing a determination of which driver to load when a computer system utilizes an operating system or a device driver which typically reads the device ID without reading the subsystem ID. The present invention addresses such a need.

The system and method according to the present invention can be applied to changing any configuration registers. The present invention is herein described in terms of an example of changing the content of a device ID register to the contents of a subsystem ID register for ease of understanding.

Figure 4:
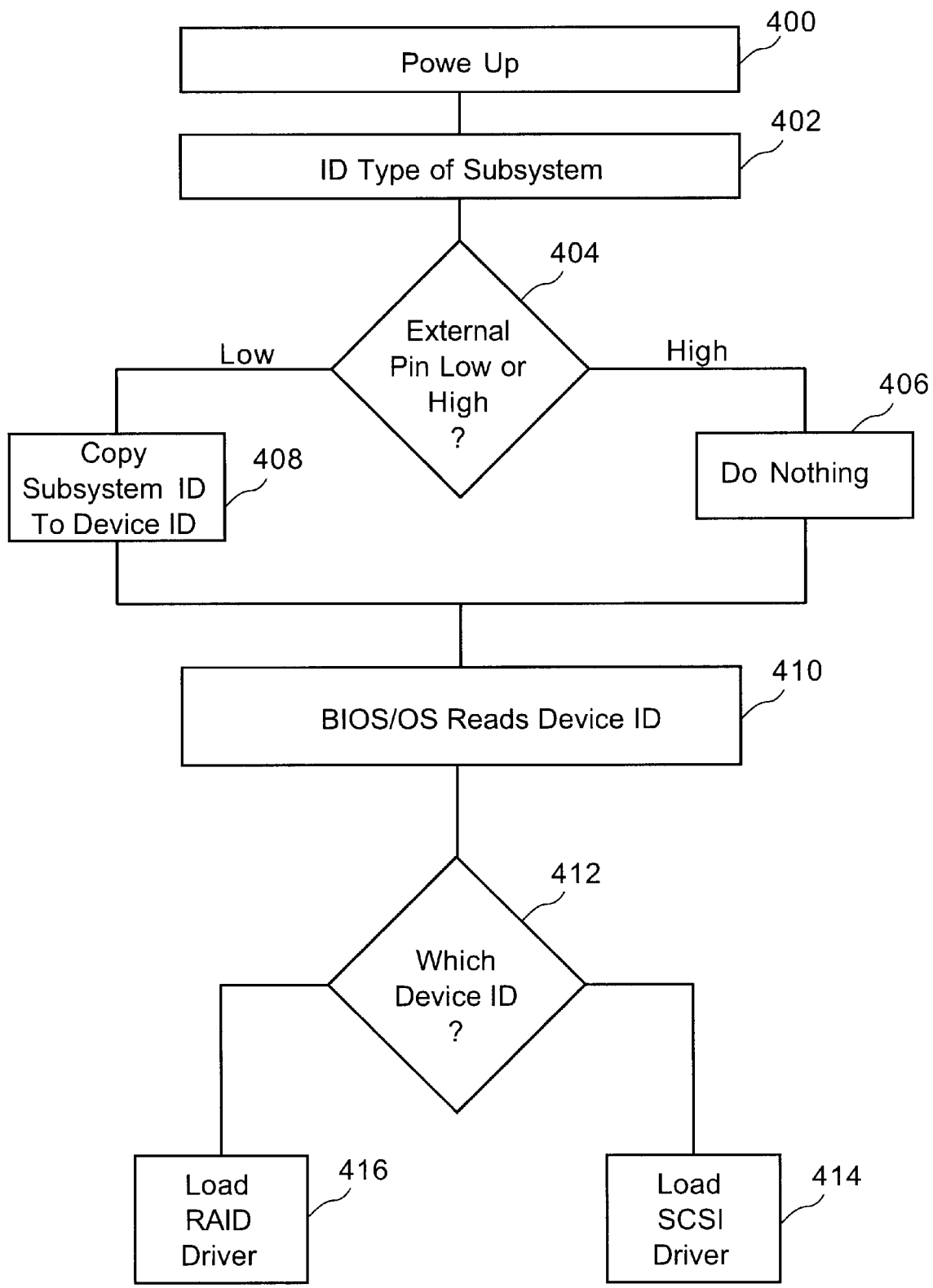
FIG. 4 is a flow diagram of a method according to the present invention for determining which driver to load.

FIG. 4 is a flow diagram of a method according to the present invention for determining which driver to load. The computer system is powered up via step 400, and the type of subsystem is identified via step 402. The type of subsystem is typically written into the subsystem ID register of the configuration space by a serial device. The serial device is preferably a programmable logic device such as Programmable Array Logic (PAL), GAL or FPGA which can be fully configurable to write the subsystem ID into the subsystem ID register. Alternatively, serial devices such as Serial Electrically Erasable Programmable Read Only Memory (SEEPROM) can also be utilized.

It is then determined whether a signal from an external pin is either low or high, via step 404. Details of the method of determining whether the signal from the external pin should be high or low, will later be described with regard to FIG. 5. If the signal is low, then the subsystem ID is copied to the device ID register via step 408. If, however, the signal is high, then no action is taken via step 406. The BIOS/OS then reads the device ID via step 410 and a driver is selected depending on the information implied by the device ID via step 412. If the device ID indicates that a RAID driver should be loaded, then the RAID driver is loaded via step 416. Alternatively, if the device ID indicates that a SCSI driver should be loaded, then the SCSI driver is loaded via step 414.

Figure 5:
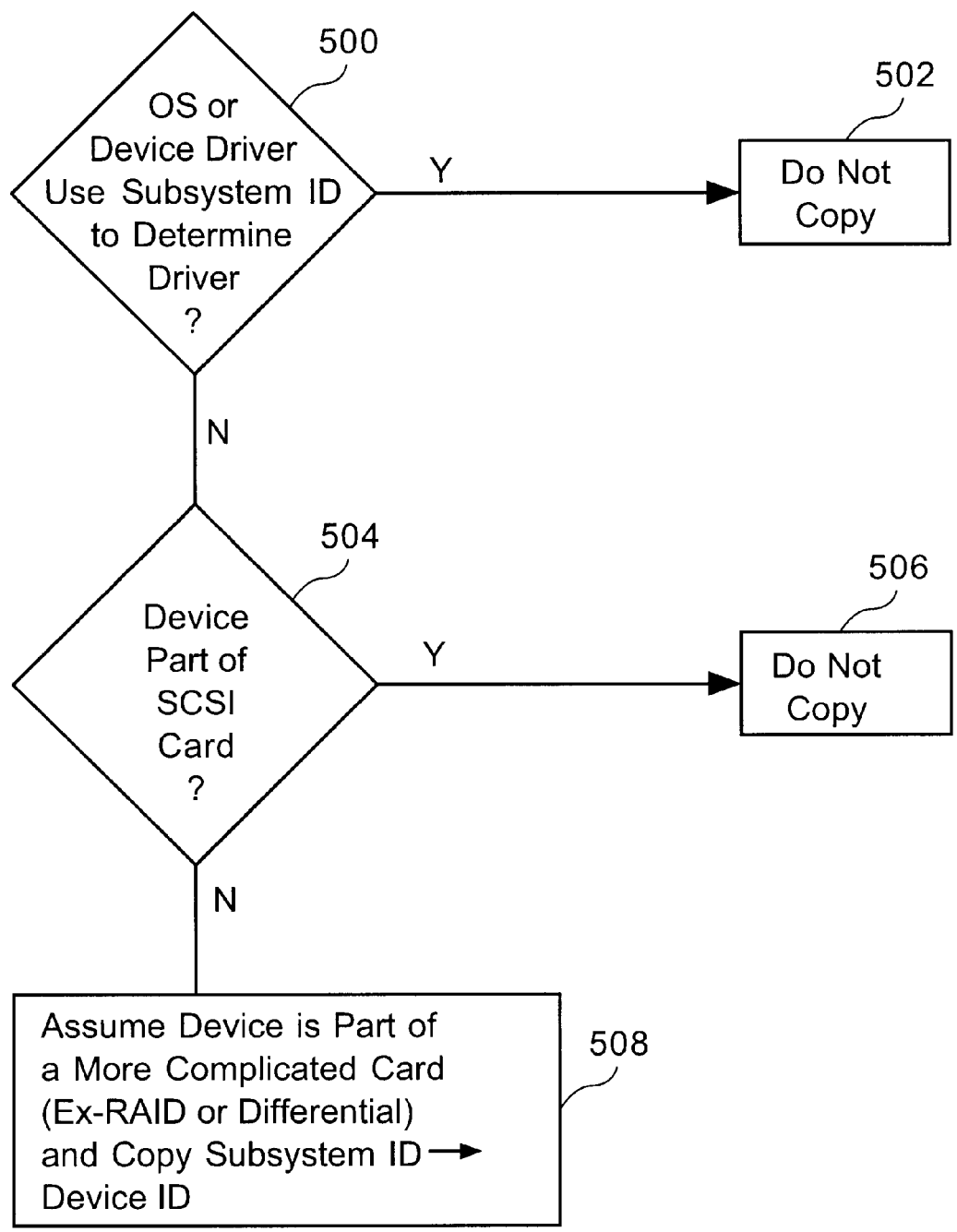
FIG. 5 is a flow diagram of a method according to the present invention of determining whether to change a PCI configuration register.

FIG. 5 is a flow diagram of step 404 of FIG. 4 in which it is determined whether the signal from the external pin should be low or high. The external pin may be set either low or high during power-on initialization by the manufacturer. Later, the external pin can be reset after initialization if a PCI add-on device requires it and configures the external pin to reset.

It is first determined whether the operating system or the device driver will use the subsystem ID to determine the driver to be used via step 500. There are some operating systems and device drivers that use the subsystem ID to determine which driver to use. Using the subsystem ID provides much better handling than using the device ID for deciding which device driver to load. For example, assume vendor A makes a device driver for device A, and vendor B uses vendor A's driver in a Host adapter (HA). Also assume that vendor B also writes a device driver for the HA. In this situation, there are two options for loading a driver: vendor A's driver and vendor B's driver. Vendor A's driver is written for device A which offers the features and performance as specified by vendor A. However, if vendor B's driver is available, it may offer a different set of features and performance as specified by vendor B. The subsystem ID will typically better determine which of these drivers to use.

However, many conventional operating systems and device drivers use the device ID without looking at the subsystem ID. If the operating system or device driver uses the subsystem ID to determine which driver to use, then the subsystem ID is not copied to the device ID via step 502. In the example shown in FIG. 4, not copying would indicate a high signal. In a different implementation, a logic low signal can be used to signify no copying.

If it is determined that neither the operating system nor the device driver use the subsystem ID to determine which driver to use via step 500, then it is determined whether the PCI device is part of a SCSI card via step 504. If it is part of the SCSI card, then the subsystem ID is not copied to the device ID via step 506. Again, in the example shown in FIG. 4, not copying would indicate a high signal. If, however, the PCI device is not part of a SCSI card via step 504, then it is known that the PCI device is part of a more complicated card, such as a RAID or a differential, and the subsystem ID is copied into the device ID register via step 508. Accordingly, when a more complicated subsystem, such as a RAID or a differential, is used, then the software which reads the device ID register will actually read the subsystem ID and load an appropriate device driver.

Figure 6:
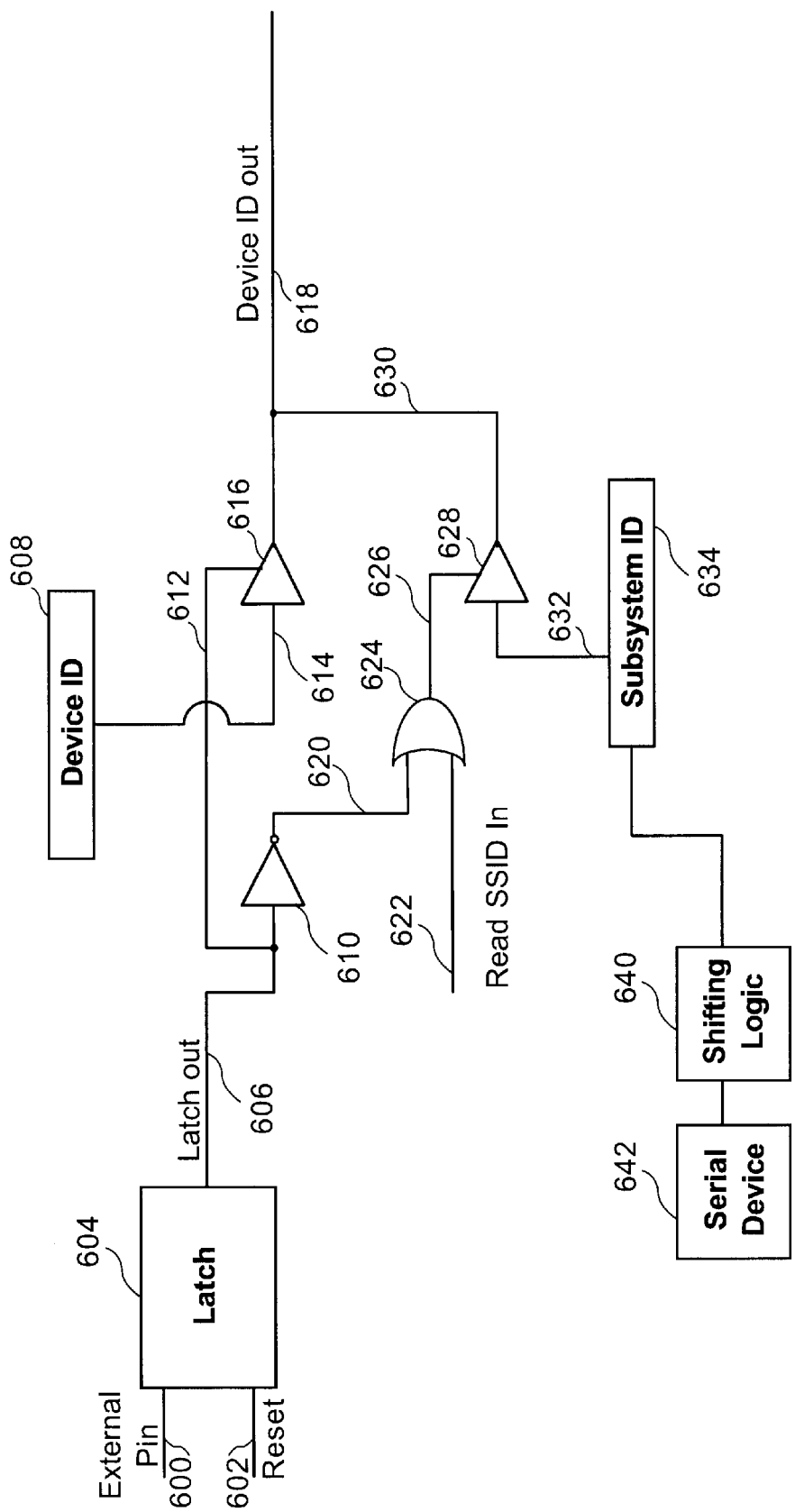
FIG. 6 is a schematic diagram of a system according to the present invention for changing a PCI configuration register.

FIG. 6 is a schematic diagram of a system according to the present invention for changing the PCI configuration register. In the schematic diagram, it is shown that the external pin signal 600 and the reset signal 602 are input into the latch 604. The latch 604 samples the status of the external pin signal 600 and holds the status at that value. The reset signal 602 latches the status of the external pin signal 600. The latch 604 outputs the external latch output 606 which is the input signal to the inverter 610. The function of the inverter 610 is to turn off the device ID buffer 616 via connection 612 and turn on the subsystem ID buffer 628 when the latch output 606 indicates that the subsystem ID is to be copied into the device ID.

The OR gate 624 can take either an input from the inverter 610 via connection 620, or a read command to read the subsystem ID via input 622. The OR gate is coupled with the subsystem ID buffer 628. The device ID output 618 is either taken from the device ID buffer 616 or the subsystem ID buffer 628 depending on which buffer is turned on by the latch output 606.

The schematic of FIG. 6 also shows a serial device 642 coupled to a shifting logic block 640 which in turn is coupled to the subsystem ID 634. The serial device 642 and the shifting logic 640 together write the subsystem ID 634.

Although the present invention has been described in accordance with the embodiment shown, one of ordinary skill in the art will readily recognize that there could be variations to the embodiment and these variations would be within the spirit and scope of the present invention. Accordingly, many modifications may be made by one of ordinary skill in the art without departing from the spirit and scope of the appended claims.

What is claimed is:

1. A method for changing a configuration register in a device coupled to a computer system, the method comprising:
    determining whether a program in the computer system accesses a content of a first register; and
    copying at least a portion of the content of the first register into a second register if the program does not access the content of the first register.

2. The method of claim 1, further comprising a step of determining which one of a plurality of programs to utilize based on the content of the second register.

3. The method of claim 2, wherein the plurality of programs include a device driver.

4. The method of claim 1, wherein the at least a portion of the content of the first register includes a subsystem ID.

5. The method of claim 1, wherein the second register includes a device ID.

6. The method of claim 1, further comprising a step of determining whether the device includes a predetermined subsystem.

7. The method of claim 6, wherein the at least a portion of the contents of the first register is not copied to the second register if the device includes the predetermined subsystem.

8. The method of claim 6, wherein the predetermined subsystem is a Small Computer System Interface (SCSI).

9. A system for changing a configuration register in a device coupled to a computer system, the system comprising:
    means for determining whether a program in the computer system accesses a content of a first register; and
    means for copying at least a portion of the content of the first register into a second register if the program does not access the content of the first register.

10. The system of claim 9, further comprising means for determining which one of a plurality of programs to utilize based on the content of the second register.

11. The system of claim 10, wherein the plurality of programs include a device driver.

12. The system of claim 9, wherein the at least a portion of the content of the first register includes a subsystem ID.

13. The system of claim 9, wherein the second register includes a device ID.

14. The system of claim 9, further comprising a step of determining whether the device includes a predetermined subsystem.

15. The system of claim 14, wherein the contents of the first register is not copied to the second register if the device includes the predetermined subsystem.

16. The system of claim 14, wherein the predetermined subsystem is a Small Computer System Interface (SCSI).

* * * * *